United States Patent [19]

Wilkes et al.

[11] Patent Number: 5,817,705
[45] Date of Patent: Oct. 6, 1998

[54] SHORT TIME FRAME PROCESS FOR PRODUCING EXTRUDED CLOSED CELL LOW DENSITY PROPYLENE POLYMER FOAMS

[75] Inventors: Gary R. Wilkes, Saratoga Springs; Jeffrey J. Stimler; Kim A. Bly, both of Queensbury; Harris A. Dunbar, Corinth, all of N.Y.; Eugene R. Uhl, Russell, Ky.

[73] Assignee: Tenneco Protective Packaging Inc., Greenwich, Conn.

[21] Appl. No.: 746,825

[22] Filed: Nov. 18, 1996

Related U.S. Application Data

[63] Continuation-in-part of Ser. No. 735,271, Oct. 22, 1996, abandoned, which is a continuation-in-part of Ser. No. 730,177, Oct. 15, 1996, abandoned.

[51] Int. Cl.⁶ .......................................................... C08J 9/00
[52] U.S. Cl. .................. 521/79; 264/53; 264/54; 521/81; 521/134; 521/142; 521/143
[58] Field of Search ................................ 521/79, 81, 134, 521/142; 264/53, 54

[56] References Cited

U.S. PATENT DOCUMENTS

| | | |
|---|---|---|
| 3,637,458 | 1/1972 | Parrish . |
| 4,217,319 | 8/1980 | Komori . |
| 4,323,528 | 4/1982 | Collins . |
| 4,421,535 | 12/1983 | Mehra . |
| 4,522,955 | 6/1985 | Fukushima et al. . |
| 4,695,672 | 9/1987 | Bunting . |
| 4,882,108 | 11/1989 | Nakajima et al. . |
| 5,116,881 | 5/1992 | Park et al. . |
| 5,149,579 | 9/1992 | Park et al. . |
| 5,180,751 | 1/1993 | Park et al. . |
| 5,225,451 | 7/1993 | Rogers et al. . |
| 5,290,822 | 3/1994 | Rogers et al. . |
| 5,348,795 | 9/1994 | Park . |
| 5,416,129 | 5/1995 | Chaudhary et al. . |
| 5,527,573 | 6/1996 | Park et al. . |

FOREIGN PATENT DOCUMENTS

WO 93/15132    8/1993    WIPO .

*Primary Examiner*—Morton Foelak
*Attorney, Agent, or Firm*—Kenyon & Kenyon

[57] ABSTRACT

A propylene homopolymer or copolymer, or a blend thereof, possessing both sufficient strain hardening, viscoelastic behavior, and melt ductility is heated, melted, and mixed in an extruder with an organic or inorganic physical blowing agent, or a mixture of organic and inorganic physical blowing agents, and with optional compatibilizing agents, nucleating agents, stabilizers and miscellaneous additives. This mixture is pressurized and, subsequently, is cooled to an appropriate temperature at an elevated pressure, and is extruded through a die at rates in excess of 1000 kg/hr to produce an expanded and dimensionally-stable, predominately closed cell propylene polymer foam with a density of between 10 kg/m³ and 150 kg/m³, and with a thickness in excess of 1.3 cm. The resultant foamed structure is characterized by a Foamability Index of greater than 1.9 and an Ebullition Time of less than $2.0 \times 10^{-4}$ seconds.

30 Claims, 2 Drawing Sheets

SHORT TIME FRAME PROCESS FOR PRODUCING EXTRUDED CLOSED CELL LOW DENSITY PROPYLENE POLYMER FOAMS

This is a continuation-in-part of U.S. Ser. No. 08/735,271 abandoned, inventors: Wilkes et al., entitled: A Short Time Frame Process For Producing Extruded Closed Cell Low Density Propylene Polymer Foams, filed on Oct. 22, 1996, which is a continuation-in-part of U.S. Ser. No. 08/730,177 abandoned having the same inventors and title, filed Oct. 15, 1996.

FIELD OF THE INVENTION

The invention relates, in general, to a process for the manufacture of a foamed thermoplastic material. More specifically, it relates to the production of thick cross-section, low-density propylene polymer foams having cominations of cell sizes and foam densities which previously have been reported as unfeasible in the art.

BACKGROUND OF THE INVENTION

Low-density polyolefinic foams which have a density of less than about 150 kg/m3, particularly those which have a base thermoplastic resin containing more than 50 percent of low-density polyethylene (LDPE), have been made for many years. Most of these LDPE-based foams have been made with a physical blowing agent using conventional foam extrusion processes. Physical blowing agents are those chemical compounds both which can be incorporated into the thermoplastic melt while within the extruders at high pressures, typically 10 to 20 MPa, and which can be contained by the polymer structure when the cooled thermoplastic/blowing agent mixture is rapidly reduced to ambient atmospheric pressure. Conventional foam processes are considered to be those in which (1) the resin is first mixed in solid form with a nucleating agent (cell size control agent) which is either an inorganic compound or a metallic salt of organic acid, or is a blend thereof, typically in powder form, (2) the solid mixture, then, is melted and pressurized, (3) a physical blowing agent is injected into the molten polymer/nucleating agent blend at high pressure with the ratio of the weight-based flow rate of the blowing agent to that of the polymer being less than about 40 percent, and (4) the resultant gas/melt blend, subsequently, is mixed and cooled extensively at high pressure before being released through a die.

In a conventional foam process, the ability to produce a dimensionally stable closed-cell foam is controlled by the strength of the polymer melt which is required to contain the expanding physical blowing agent vapors at a high temperature. The high degree of crystallinity of common polypropylenes contributes to poor melt strength. Thus, conventional foam extrusion processes for producing polyolefinic foams which are predominately polypropylene have been limited by the melt strength of common polypropylenes. Consequently, conventional process polyolefinic foams for which the base thermoplastic resin is primarily polypropylene have been commercially available only since the advent of "high melt strength" polypropylene in the mid-1980's, and such foams are still limited in usage.

U.S. Pat. No. 3,637,458 (Parrish) discloses a process for making a low-density polyhedral-shaped closed cell foam sheet having a median diameter of at least 500 microns, using a high work-to-break thermoplastic crystalline polymer such as isotactic polypropylene. The process of the Parrish disclosure involves a non-conventional flash extrusion process, and is limited to the production of foam sheets of less than about 0.2 cm in thickness. The preferred operating range for the cited process is published as being less than 15 kg/m$^3$.

U.S. Pat. No. 4,217,319 (Komori) discloses a process for producing polyolefin foams with various volatile organic compounds as the physical blowing agent. U.S. Pat. Nos. 5,290,822 (Rogers et al.) and U.S. Pat. No. 5,225,451 (Rogers et al.) disclose processes for producing ultra-low density foam using polymer blends which are primarily polyethylene.

U.S. Pat. No. 4,323,528 (Collins) discloses a method and an apparatus for manufacturing a large size, low density polyolefinic foam sheet having a thickness in excess of 25 mm, without restricting the physical blowing agent. The intermittent process disclosed in the Collins patent is modified to accept high-melt strength polypropylene, and provides the primary embodiment for the current disclosure.

U.S. Pat. No. 4,522,955 (Fukushima et al.) describes a method for producing a highly expanded polypropylene foam by using a polypropylene resin having a specified melt tension. The Fukushima et al. patent teaches that the melt tension of the polypropylene base resin is the primary controlling factor in the production of a closed cell polypropylene foam. The work is primarily focused upon producing foams which have a density of less than about 40 kg/m$^3$ with a cell diameter of about 0.3 to 0.6 mm in diameter.

U.S. Pat. No. 4,882,108 (Nakajima et al.) describes a method for producing a cross-linked, uniformly foamed article which is made from a copolymer resin which is primarily polypropylene but which contains 2 to 10 percent by weight of polyethylene and which uses a crosslinking agent which decomposes in the front stage of a specifically designed long-land die with a foaming agent which decomposes in the rear stage of the same long-land die.

U.S. Pat. No. 5,116,881 (Park et al.), U.S. Pat. No. 5,149,579 (Park et al.), and U.S. Pat. No. 5,180,751 (Park et al.) disclose a process and a composition for producing polypropylene foam sheets from high melt strength polypropylene, but the sheets which are produced are limited to having densities above 2.5 lb/ft$^3$ (42 kg/m$^3$) with sheet thicknesses below 0.200 inch (5.0 mm). These foams are primarily used in the thermoformable application of small parts, such as, disposable plates, cups, and bowls.

U.S. Pat. No. 5,348,795 (Park) discloses a process for producing a dimensionally stable, open-cell polypropylene foam having more than 20 percent open cell content, using organic physical blowing agents. U.S. Pat. No. 5,527,573 (Park et al.) reveals a process for producing a closed-cell polypropylene foam structure having more than 80 percent of closed cells from a polypropylene resin having a defined foamability index of less than about 1.8 in units of lb/ft$^3$-mm. International Patent No. WO 93/15132 (Park) discloses a dimensionally stable polypropylene foam with an inorganic blowing agent. While applicable to both open and closed cell foams, the process with inorganic blowing agents is limited to combinations of cell sizes and densities which result in cell wall thicknesses within a specified range.

Patents for several processes involving the use of atmospheric gases to produce both polyethylene and polypropylene foams have been issued in the 1990's. For example, U.S. Pat. No. 5,416,129 (Chaudhary et al.) discloses a process for preparing uncrosslinked ethylenic polymer foam using a polymer of a defined melt tension with either argon, carbon dioxide, or blends thereof. The Chaudhary et al.

disclosure indicates that blends of argon and carbon dioxide can function as physical blowing agents with ethylenic materials having a specific melt tension, but the associated reported data also suggests difficulty in maintaining satisfactory long term foam quality.

Patented processes for the purification of hydrocarbon effluent gases have utilized the enhanced solubility of acid gases in certain polyethers such as tetraethylene glycol dimethyl ether. U.S. Pat. No. 4,421,535 (Mehra) and U.S. Pat. No. 4,695,672 (Bunting) describe processes which utilize physical solvents such as tetraethylene glycol dimethyl ether to remove acid gases such as carbon dioxide from hydrocarbon gas streams. These disclosures demonstrate the high affinity of the ether chemical bond for certain gases.

SUMMARY OF THE INVENTION

An object of the invention is to provide a means by which a simple, low cost and reliable technique can be used to produce a low-density propylene polymer foam which can be used for higher strength and higher service temperature applications than can existing polyethylenic foams. A second object of the invention is to provide a means by which a reliable technique can be used to produce a high density, energy absorbing material for high speed impact protection. A third object of the invention is to provide a means by which a simple, low cost and reliable technique can be used to produce a low-density polypropylene polymer foam which does not contain any chemical compounds which have been shown to exhibit adverse effects on the stratospheric ozone concentration. An additional object of the invention is to provide a means to prepare light-weight stiff materials for use as the corestocks in composite structures, and in acoustical and energy absorbing structures. An additional object of the invention is to incorporate blowing agents which eliminate the need for sophisticated safety protection devices and/or elaborate emission control technology. A further object of the invention is to produce a stable foam structure, the physical properties of which will not significantly deteriorate over the course of time. An additional object of the invention is to produce a foam material which will not adversely affect the surface characteristics of other materials with which the foam may be placed in intimate contact. Other objects and advantages of the invention are set out herein or are obvious herefrom to one skilled in the art.

The objects and advantages of the invention are achieved by the process of the invention.

The invention involves, in general, a process for manufacturing a foam thermoplastic material which contains greater than 50 percent by weight of propylene polymer. More specifically, the invention involves a process for producing large cross-section propylene polymer foams having structural combinations of cell sizes and densities which heretofore have been reported as unfeasible in the art. This is accomplished by extruding through a die at high rates molten propylene homopolymer or copolymer, or blends thereof, which possess sufficient strain hardening, viscoelastic behavior, and melt ductility, mixed with a physical blowing agent.

In accordance with the aforementioned objects, this invention provides a method for producing a propylene polymer foam from a thermoplastic polymeric resin blend which is at least 50 percent polypropylenic and which contains a major fraction of high melt strength polypropylene, while using a physical blowing agent which may be either an organic or an inorganic chemical compound, or a blend thereof.

Also in accordance with the objects of the invention, the disclosed process optionally can include the use of a compatibilizing agent to be used with inorganic blowing agents at the lower portion of the density range. The compatibilizing agent, if included, is one or more materials selected from chemical compounds that contain multiple ether bonds and may contain multiple hydroxyl groups, that will both sufficiently plasticize the thermoplastic extrudate and maintain die melt temperatures sufficiently low to produce a closed cell foam structure. The compatibilizing agents are used for specific inorganic materials with the polypropylenic resin to further lower the effective lower density limit of the process with the specific physical blowing agent.

In traditional polyolefinic foam extrusion processes, pellets of the thermoplastic resin are blended with a solid phase nucleating agent and, then, are melted in a heated extruder where the plastic and nucleating agent combination are held under high temperature and pressure. The physical blowing agent which generally dissolves in the polymer melt within the extruder, and which will phase transition to gas at die melt temperatures and atmospheric pressure, is added to the pressurized melted polymer. Within the molten extrudate, the blowing agent tends to act as a plasticizer to reduce the viscosity and, thus, it lowers the level of temperature necessary to maintain the hot melt condition of the mixture of thermoplastic material and nucleating agent. The blowing agent is mixed with the melted plastic and nucleating agent, and the combination, subsequently, is cooled to an extrusion temperature suitable for foaming. A permeation modifier agent, which is usually either an ester of a fatty acid having a chain of 16 to 22 carbon atoms or a compound such as stearyl stearamide, is often also added to prevent the collapse of the resulting foam structure over time. The cooled combination is pushed through a die by the pressure gradient, and when released to atmospheric pressure, the physical blowing agent expands to form bubbles of gas at the nucleating sites established by the uniformly dispersed nucleating agent particles. One particular example utilizes low-density polyethylene as the plastic, isobutane as the blowing agent, crystalline silica as the nucleating agent, and glyceryl monostearate as the permeation modifier.

In the disclosed process invention, pellets of propylene polymer and, optionally, of propylene copolymers are loaded in their solid form into an extrusion hopper. The total polypropylene content is in excess of 50 weight percent of propylene monomer units. Preferred polypropylene resins have melt flow indexes between 0.1 and 10 grams per 10 minutes at 230° C. (ASTM Condition L). Propylene copolymers have up to 20 weight percent of polymerized comonomer. No permeation modifier is required. The pellets, then, are fed into an extruder along with between 0 and 2.0 weight percent of active nucleating agent and, optionally, with additional stabilizers, pigments, and process enhancers. The pellet mix is conveyed through the feed section of the extruder, heated and melted into a thermoplastic melt. Physical blowing agents or blends of blowing agents (either organic or inorganic or a combination of inorganic and inorganic compounds) are injected into the plasticated melt, between 0.025 and 0.5 kg moles of gas per 100 kilograms by weight of polymer. Optionally, a compatibilizing agent which is either a liquid or liquefied polyglycol ether or a liquid or liquefied polyglycol or a 20 to 80 percent by weight aqueous solution of polyglycerol, particularly one that is predominately triglycerol, is added to the polymer/blowing agent mix either separate from, or directly with, the blowing agent addition at the injection port of the extruder in a molar ratio appropriate for the physical blowing agent feed, or a compatibilizing agent which is a polyethylene oxide of molecular weight between 200,000 and 1,000,000 is added with the resin feed while water is added as a physical blowing agent, or blends of these different compatibilizing agents are added. The polymer melt is mixed within the extruder, subsequently cooled to an appropriate foaming temperature, and extruded through a die sized to produce the desired product dimension at an instantaneous rate greater than 1000 kg/hr. The extrudate, then, is formed into the desired shape and cooled by convective, conductive and radiative heat transfer with the ambient environment.

The preferred propylene polymers exhibit strain hardening in the melt phase, display good melt extensibility, and have high melt tension. A necessary but non-sufficient condition for dimensionally stable foaming is that the propylene polymer or polymer blend exhibit a loss tangent (tan L) (which is defined as the ratio of viscous loss modulus of a polymer to its elastic storage modulus) of less than 1.2 at 190° C. and 1 radian per second frequency. This viscoelastic data is measured on a dynamic mechanical spectrometer using a 25 mm diameter specimen, 1.75 to 2.5 mm specimen thickness, and a 10 percent maximum strain.

Permissible blowing agents include inorganic and inert gases at room temperature, such as, nitrogen, argon, helium, and carbon dioxide. In addition, water is also an acceptable blowing agent, alone or in conjunction with other blowing agents. Permissible organic blowing agents include aliphatic hydrocarbons, such as, methane, ethane, propane, n-butane, isobutane, n-pentane, isopentane and neopentane. Permissible organic blowing agents also include halogenated hydrocarbons, such as, HFCs', HCFCs', and CFCs'. Examples of the halogenated hydrocarbon blowing agents include 1,1,1,2,2-pentafluoroethane (HFC-125), 1,1,1,2-tetrafluoroethane (HFC-134a), 1-chloro-1,2-difluoroethane (HCFC-142b), 1,1,1-trifluoroethane (HFC-143a), and 1,1-difluoroethane (HFC-152a).

A key differentiation from the art is the shift in foaming rate caused by the high instantaneous extrusion rate of the intermittent process employed to foam. Rates in excess of 4000 kg/hr result in an order of magnitude higher strain rate, which results in lower loss tangent and higher melt tension which translates into the capability of producing low density, small and large cell size, dimensionally stable propylene foams claimed to be impossible in the cited art. The rheological characteristics best cited as predictors of acceptable foaming are:

(1) A Foamability Index (FI) in excess of 1.9 as defined in the same manner of U.S. Pat. No. 5,527,573 (Park et al.) by the relationship:

$$FI = \rho * D * (\tan L)^{0.75}$$

where
FI is the Foamability Index,
$\rho$ is the density of the foam in lb/ft$^3$,
D is the average cell size in millimeters,
and tan L is G"/G', where
  G" is the loss modulus of the propylene polymer blend, and
  G' is the storage modulus of the propylene polymer blend, both G" and G being measured at an oscillating frequency of 1 radian/sec, 190° C., specimen diameter of 25 mm, specimen of 1.75 mm thickness, and maximum strain of 10 percent.

(2) An Ebullition Time of less than $2.0 \times 10^{-4}$ seconds defined by the following equation:

$$ET = 3.6 \times 10^{-3} * (\rho/C) * \tan L/(Q/A)$$

where
ET is the Ebullition Time in seconds,
C is the linear cell count density of the resultant foam in cell/cm,
Q is the instantaneous die extrusion rate in kg/hr,
A is the open cross sectional area of the die in cm$^2$,
$\rho$ is the density of the resultant foam in kg/m$^3$, and tan L is as defined in the Foamability Index relationship above. Note that C (the linear cell count density) is related to D (the average cell size) by the relationship:

$$C = 10 * (4/\pi)^2 / D$$

Broadly, the invention involves a process for making a closed-cell, low density, thick cross-section, predominately propylene polymeric resin foam having a density of 10 kg/m$^3$ to 150 kg/m$^3$, comprising:

(a) mixing a propylene homopolymer or copolymer, or blends thereof, having at least 50 percent propylene monomeric units and possessing sufficient strain hardening, viscoelastic behavior and melt ductility characteristics with nucleating agents, and having optional stabilizers, pigments and processing enhancers;

(b) plasticating the mixture in an extruder (c) incorporating an effective amount of at least one pressurized organic or inorganic blowing agent, or blends thereof, into the propylene polymeric melt to form a foamable composition;

(d) optionally incorporating an effective amount of a polyglycol, a polyglycol ether, a polyethylene oxide or a 20 to 80 weight percent aqueous solution of a polyglycerol, that is predominately triglycerol into the foamable composition;

(e) cooling the foamable composition to a temperature effective for the expansion of the low-density propylene polymer foam; and (f) extruding or ejecting the foamable composition through a die at a sufficiently high strain rate to foam the low density propylene polymeric resin foam.

The process includes variations and modes, which in addition to the propylene polymer and modulating agent, have the further components and blowing agents set out in the following table:

| INORGANIC BLOWING AGENT | ORGANIC BLOWING AGENT | COMPATIBILIZING AGENT | POLYMERIC MODIFIER |
|---|---|---|---|
| X | | | |
| | X | | |
| X | X | | |
| X | | X | |
| X | X | X | |
| X | | | X |
| | X | | X |
| X | X | | X |
| X | | X | X |
| X | X | X | X |

The invention process includes the following modes or variations, for example:

A. The process being conducted where the propylene polymer resin is a propylene polymer mixture containing at least 50 weight percent of branched propylene polymer, and where the blowing agent is 0.025 to 0.5 kg-mols per 100 kg of total propylene polymer, of an inorganic, halogen-free blowing agent.

B. The process being conducted where the propylene polymer resin is a propylene polymer mixture containing at least 50 weight percent of branched propylene polymer, and where the blowing agent is 0.025 to 0.5 kg-mols per 100 kg of total propylene polymer, of an aliphatic organic or of a partially fluorinated hydrocarbon blowing agent.

C. The process being conducted where the propylene polymer resin is a propylene polymer mixture containing at least 50 weight percent of branched propylene polymer, and where the blowing agent is a total of up to 0.5 kg-mols per 100 kg of total propylene polymer, of an inorganic, halogen-free blowing agent blended with an aliphatic organic or a partially fluorinated blowing agent.

D. The process being conducted where the propylene polymer resin is a propylene polymer mixture containing at least 50 weight percent of branched propylene polymer, where the blowing agent is 0.025 to 0.5 kg-mols per 100 kg of total propylene polymer of an inorganic, halogen-free blowing agent, and where a compatibilizing agent which is 0.1 to 2.5 weight percent of a polyglycol, a polyglycol ether, a polyethylene oxide, or a 20 to 80 percent by weight aqueous solution of a polyglycerol that is predominately triglycerol is incorporated into the foamable composition.

E. The process being conducted where the propylene polymer resin is a propylene polymer mixture containing at least 50 weight percent of branched propylene polymer, where the blowing agent is a total of up to 0.5 kg-mols per 100 kg of total propylene polymer is a blend of an inorganic, halogen-free blowing agent and an aliphatic organic or partially fluorinated blowing agent, and where a compatibilizing agent which is 0.1 to 2.5 weight percent of a polyglycol, a polyglycol ether, a polyethylene oxide, or a 20 to 80 percent by weight aqueous solution of a polyglycerol that is predominately triglycerol is incorporated into the foamable composition.

F. The process being conducted where the propylene polymer resin is a propylene polymer mixture containing at least 50 weight percent of branched propylene polymer, where the blowing agent is 0.025 to 0.5 kg-mols per 100 kg of total propylene polymer, of an inorganic, halogen-free blowing agent, and where greater than 1 percent and less than 30 weight percent of a polymeric modifier (based on the propylene polymer resin weight content) is added to the resin feed.

G. The process being conducted where the propylene polymer resin is a propylene polymer mixture containing at least 50 weight percent of branched propylene polymer, where the blowing agent is 0.025 to 0.5 kg-mols per 100 kg of total propylene polymer, of an aliphatic organic or partially fluorinated hydrocarbon blowing agent, and where greater than 1 percent and less than 30 weight percent of a polymeric modifier (based on the propylene polymer resin weight content) is added to the resin feed.

H. The process being conducted where the propylene polymer resin is a propylene polymer mixture containing at least 50 weight percent of branched propylene polymer, where the blowing agent is a total of up to 0.5 kg-mols per 100 kg of total propylene polymer, of a blend of an inorganic, halogen-free blowing agent and an aliphatic, organic or partially fluorinated blowing agent, and where greater than 1 weight percent and less than 30 weight percent of a polymeric modifier (based on the propylene polymer resin weight content) is added to the resin feed.

I. The process being conducted where the propylene polymer resin is a propylene polymer mixture containing at least 50 weight percent of branched propylene polymer, where the blowing agent is 0.025 to 0.5 kg-mols per 100 kg of total propylene polymer, of an inorganic, halogen-free blowing agent, where greater than 1 weight percent and less than 30 weight percent of a polymeric modifier (based on the propylene polymer resin weight content) is added to the resin feed, and where a compatibilizing agent which is 0.1 to 2.5 weight percent of a polyglycol, a polyglycol ether, a polyethylene oxide, or a 20 to 80 percent by weight aqueous solution of a polyglycerol that is predominately triglycerol is incorporated into the foamable composition.

J. The process being conducted where the propylene polymer resin is a propylene polymer mixture containing at least 50 weight percent of branched propylene polymer, where the blowing agent is a total of up to 0.5 kg-mols per 100 kg of total propylene polymer, of a blend of an inorganic, halogen-free blowing agent and an aliphatic organic or partially fluorinated blowing agent, where greater than 1 weight percent and less than 30 weight percent of a polymeric modifier (based on the propylene polymer resin weight content) is added to the resin feed, and where a compatibilizing agent which is with 0.1 to 2.5 weight percent of a polyglycol, a polyglycol ether, a polyethylene oxide, or a 20 to 80 percent by weight aqueous solution of a polyglycerol that is predominately triglycerol is incorporated into the foamable composition.

DETAILED DESCRIPTION OF THE INVENTION

The propylene polymeric resin used in the invention process can be any one of those obtained by polymerizing propylene, or polymerizing propylene with other aliphatic polyolefins, such as, ethylene, 1-butene, 1-pentene, 3-methyl-1-butene, 4-methyl-1-pentene, 4-methyl-1-hexene, 5-methyl-1-hexene and mixtures thereof, or with various other polymerizable monomers.

The term "propylene polymeric resin (or material)", as used herein, is meant to include not only homopolymers of propylene, but also propylene copolymers composed of both at least 50 mole percent (preferably at least 70 mole percent) of a propylene unit and a minor proportion of a monomer copolymerizable with propylene, and blends of at least 50 percent by weight (preferably at least 60 percent by weight) of the propylene homopolymer with another polymer.

Also permissible are blends of propylene polymeric resin with one or more "polymeric modifiers", as used herein to include low density polyethylene (LDPE), medium density polyethylene (MDPE), high density polyethylene (HDPE), linear low density polyethylene (LLDPE), polyolefin elastomers, polyolefin plastomers, saturated and unsaturated styrene-butadiene random and block copolymer rubbers, polyamides, ethylene ethyl acrylate (EEA), ethylene methyl acrylate (EMA), ethylene acrylic acid (EAA), ethylene methacrylic acid (EMAA), ethylene vinyl alcohol (EVOH), ethylene vinyl acetate (EVA), ethylene propylene diene monomer copolymer (EPDM) rubbers, and olefinic ionomers, such that the total propylene monomer units are in excess of 50 weight percent.

The preferred propylene polymer blend contains at least 50 percent by weight of "high melt strength" polypropylene which has a loss tangent less than or equal to 1.2 at 1 radian/sec frequency and 190° C., a density of about 900 to 910 kg/m³, and a melt flow index in the range of 2.2 to 3.8 g per 10 minutes. In general, the propylene polymer should have a melt (flow) index of less than about 10 grams per 10 minutes. The melt (flow) index (ASTM D1238) is the nominal flow rate at 230° C. and 298.2 kPa, and is expressed as grams per 10 minutes. The high melt strength polypropylene used in the invention process has a branched molecular structure, providing increased molecular entanglement.

Fundamentally, the production of dimensionally stable, closed cell foams depends on several physical and rheological factors. A stable foam is created when the cell walls and the cell struts of the foam are such that it can structurally support itself while the polymer is still molten during the expansion process, while it subsequently cools, and while blowing agent diffusion occurs with the surrounding environment. This structural support is largely determined by the amount of polymer present, its cooling rate, its distribution between the cell walls and the cell struts, the strength of the polymer both while molten and after it solidifies, and the orientational strains imparted to the polymer during the expansion process. In addition, either the polymer melt ductility or the polymer melt elongational strain limit is also important in determining if the developing cellular structure remains closed or becomes open.

Generally, the amount of polymer material in the cell walls and struts is determined by the total expansion of the foam, i.e., its density, and the cell size. More specifically, cell wall thickness can be approximated by multiplying the product of density and cell size by a constant. Therefore, for a given density, larger sized cells have thicker cell walls.

The strength of the cell walls after solidification is largely determined by the selection of the polymer and its tensile strength and flexural modulus. However, the strength of the molten polymer in the cell walls during expansion is largely determined by its viscoelastic behavior. This viscoelastic behavior is often estimated through uniaxial melt tension measurements, which are determined by measuring the force required to wind up a polymer strand at a constant wind-up speed after being discharged at a set temperature and rate from a capillary die. U.S. Pat. No. 4,522,955 (Fukushima et al.) teaches a process for producing a highly expanded polypropylene foam using a polypropylene resin having a melt tension in excess of a specified value. In the present invention, high melt tension is also a necessary property. However, high melt tension alone is insufficient to guarantee a dimensionally stable, closed cellular structure. In addition, melt tension as measured above is limited to a very narrow portion of the time-temperature domain, and, therefore, is an inadequate characterization of the time-temperature viscoelastic response of a polymer.

Figure 1:
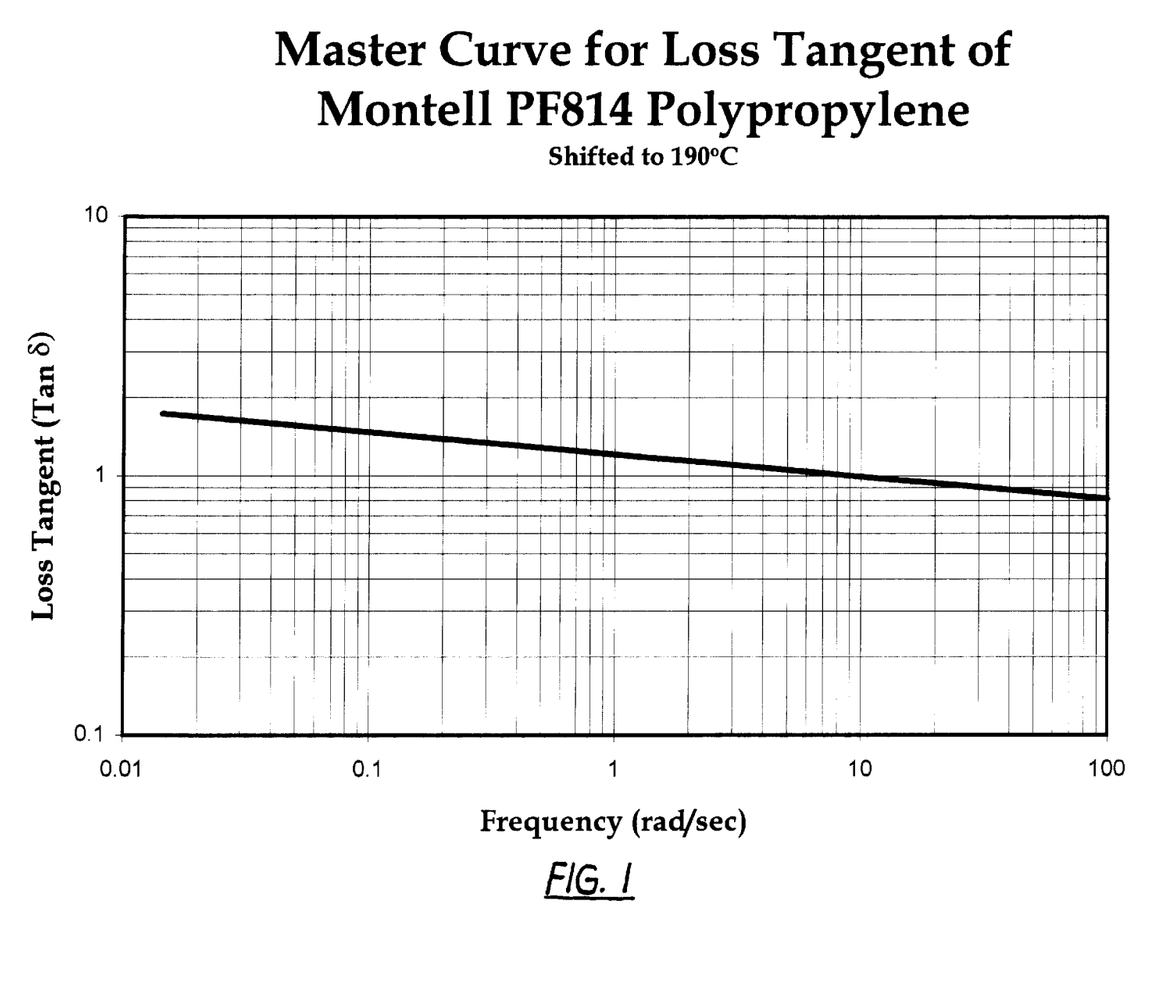
FIG. 1 is a graph of the loss tangent for a polypropylene.

Another method of measuring the viscoelastic behavior of molten polymers is by quantifying the loss tangent (tan L) of the material using a dynamic mechanical spectrometer. Dynamic mechanical spectroscopy involves measuring the torque resulting from an induced oscillatory strain on a molten polymer sample. Specifically, the procedure involves placing a disk-like sample measuring 25 mm in diameter and between 1.75 mm and 2.5 mm in thickness between axially spaced surfaces in such a way that the axial space between the surfaces is completely filled with the molten polymer sample. Once the sample is heated to the desired temperature for testing, one of the surfaces is then rotated relative to the other in an oscillatory fashion, placing the test specimen in dynamic shear. Maximum strain on the sample is usually limited to 10 percent to prevent strain induced effects from impacting the results. The time dependent torque resulting from the induced strain is measured. Both the magnitude of the torque and the degree that its response is out of phase with the induced strain are used to determine G" (the viscous or loss component) and G' (the elastic or storage component). The parameter tan L for the present invention is calculated as G" divided by G'. Using the time-temperature superposition principle, master curves of storage modulus, loss modulus, and loss tangents versus frequency at a specified temperature can be created from a compilation of individual dynamic test data. The principle of time-temperature superposition suggests that it is possible to interrelate the time and temperature dependence of viscoelastic properties of polymers. For instance, a polymer which displays rubbery characteristics under a given set of conditions can be induced to show glassy behavior by either reducing the temperature or increasing the testing rate or frequency. As a result, viscoelastic properties of a polymer can be shifted in the time-temperature continuum to create master curves depicting the characteristic response of the polymer. Such a master curve for the loss tangent for Montell Polypropylene PF814 (shifted to 190° C.) is shown in FIG. 1 below.

Often, the response of a particular material will be characterized by a tan σ value quoted at a particular frequency such as 1.0 radians/second. U.S. Pat. No. 5,527,573 (Park et al.) utilizes such a material parameter to define the foamability factor. The foamability factor, also referred to therein as the foamability index, combines propylene resin properties with the final propylene polymer foam properties to define how a closed cell propylene polymer foam structure is possible. According to U.S. Pat. No. 5,527,573, only when the foamability factor is less than or equal to 1.8 is a closed cell propylene polymer foam possible.

However, the approach of characterizing the viscoelastic response of a polymer by specifying a tan σ value at both a single frequency and temperature ignores the time-dependent response of the polymer. Furthermore, it fails to account for the changing time and temperature domains inherent in the foaming process during the expansion, cooling, and stabilization of a molten polymer exiting the die. Referring to the master curve for the polypropylene in FIG. 1, and applying the principle of time-temperature superposition, propylene polymer being foamed will be subjected to some initial strain frequency, shifted to 190° C. With time, its viscoelastic response will progress to the right on the curve as the polymer expands, cools and stabilizes.

The present invention details a short time frame (i.e., higher frequency) process for producing closed cell propylene polymer foams. High instantaneous extrusion rates at the die in excess of 1000 kg/hr shift the initial strain frequency experienced by the polymer further to the right on the master curve. Evidence for this frequency shift is the higher foam expansion rate observed when the extrusion rate is increased. As a result, the propylene polymer spends a longer average time during the foam expansion process at a lower tan σ. Therefore, the higher elasticity to viscous response component of the polymer at this frequency allows the stabilization of thicker cells walls. Given the relationship described earlier between cell wall thickness, density and cell size, it becomes possible to produce closed cell propylene polymer foams whose product of density and average cell size, when combined with the resin characteristic tan σ, surprisingly results in a foamability index clearly in excess of the upper limit of 1.8 taught in the prior art.

Figure 2:
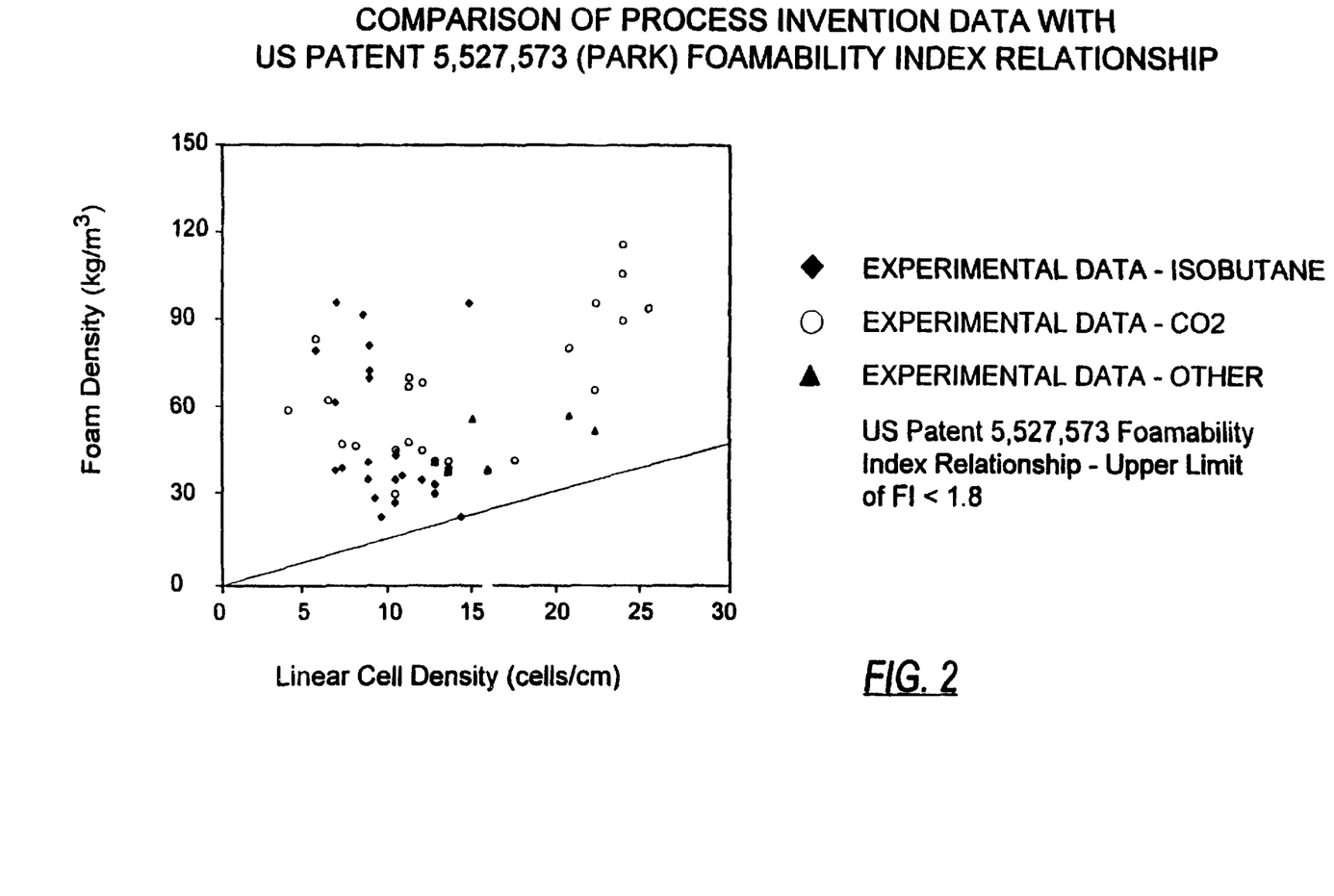
FIG. 2 is a graph comparing invention data and prior art regarding the foamability index relationship.

FIG. 2 shows a graphical representation of the foamability indexes summarized in Table 1 for various propylene polymer foam samples produced from propylene polymer blends with a tan σ equal to 1.2. Clearly, the data for all of the samples produced with a variety of blowing agents fall above the maximum Park foamability factor of 1.8, an operating region believed to be impossible for the production of closed cell propylene polymer foams until the present invention.

TABLE 1

PROCESS INVENTION RUN DATA

| Run ID | Blowing Agent Type | $\rho$ [Foam Density] $(kg/m^3)$ | C [Linear Cell Density] $(cells/cm^2)$ | tan δ [Loss Tangent] | Die Type | A [Die Cross Section Area] $(cm^2)$ | Q [Instantaneous Die Extrusion Rate] (kg/hr) | Park Foamability Index | Ebullition Time $(10^{-4}\ sec)$ |
|---|---|---|---|---|---|---|---|---|---|
| 60625-S1 | Isobutane | 39.4 | 7.1 | 1.2 | 2 | 7.810 | 3402 | 6.49 | 0.55 |
| 60626-S1 | Isobutane | 38.6 | 6.7 | 1.2 | 3 | 12.060 | 3402 | 6.73 | 0.88 |
| 60626-S2 | Isobutane | 62.2 | 6.7 | 1.2 | 3 | 12.060 | 4309 | 10.83 | 1.12 |
| 60627-S1 | Isobutane | 80.1 | 5.5 | 1.2 | 3 | 12.060 | 4082 | 16.95 | 1.85 |
| 60627-S2 | Isobutane | 92.3 | 8.3 | 1.2 | 3 | 12.060 | 4082 | 13.02 | 1.42 |
| 60627-S3 | Isobutane | 96.1 | 6.7 | 1.2 | 3 | 12.060 | 4082 | 16.75 | 1.83 |
| 60709-S1 | $CO_2$ | 70.5 | 11.0 | 1.2 | 3 | 12.060 | 5298 | 7.46 | 0.63 |
| 60709-S2 | $CO_2$ | 68.9 | 11.8 | 1.2 | 3 | 12.060 | 5298 | 6.80 | 0.57 |
| 60710-S1 | $CO_2$ | 67.3 | 11.0 | 1.2 | 3 | 12.060 | 5298 | 7.12 | 0.60 |
| 60710-S2 | $CO_2$ | 59.3 | 3.9 | 1.2 | 3 | 12.060 | 5298 | 17.56 | 1.48 |
| 60715-S1 | Isobutane | 72.9 | 8.7 | 1.2 | 4 | 14.130 | 4429 | 9.82 | 1.16 |
| 60715-S2 | Isobutane | 70.5 | 8.7 | 1.2 | 4 | 14.130 | 4429 | 9.49 | 1.12 |
| 60715-S3 | Isobutane | 41.6 | 8.7 | 1.2 | 4 | 14.130 | 5649 | 5.61 | 0.52 |
| 60716-S1 | Isobutane | 96.1 | 14.6 | 1.2 | 4 | 14.130 | 4772 | 7.70 | 0.84 |
| 60716-S2 | Isobutane | 81.7 | 8.7 | 1.2 | 4 | 14.130 | 4772 | 11.00 | 1.21 |
| 60717-S1 | Isobutane | 32.0 | 9.1 | 1.2 | 5 | 9.480 | 3856 | 4.13 | 0.38 |
| 60717-S2 | Isobutane | 28.8 | 9.1 | 1.2 | 5 | 9.480 | 4491 | 3.71 | 0.29 |
| 60717-S3 | Isobutane | 27.2 | 10.2 | 1.2 | 5 | 9.480 | 4491 | 3.10 | 0.24 |
| 60717-S4 | Isobutane | 22.4 | 9.4 | 1.2 | 5 | 9.480 | 4491 | 2.77 | 0.22 |
| 60717-T1 | $CO_2$ | 94.8 | 25.2 | 1.2 | 1 | 7.409 | 5122 | 4.39 | 0.24 |
| 60718-S1 | Isobutane | 39.4 | 13.4 | 1.2 | 5 | 9.480 | 4237 | 3.43 | 0.28 |
| 60718-S2 | Isobutane | 33.6 | 12.6 | 1.2 | 5 | 9.480 | 4237 | 3.12 | 0.26 |
| 60718-S3 | Isobutane | 30.4 | 12.6 | 1.2 | 5 | 9.480 | 4237 | 2.82 | 0.23 |
| 60718-S4 | Isobutane | 22.4 | 14.2 | 1.2 | 5 | 9.480 | 4218 | 1.85 | 0.15 |
| 60718-T1 | $CO_2$ | 83.9 | 5.5 | 1.2 | 1 | 7.409 | 3266 | 17.77 | 1.49 |
| 60718-T2 | $CO_2$ | 62.6 | 6.3 | 1.2 | 1 | 7.409 | 3266 | 11.60 | 0.97 |
| 60718-T3 | $CO_2$ | 48.5 | 11.0 | 1.2 | 1 | 7.409 | 3266 | 5.14 | 0.43 |
| 60718-T4 | $CO_2$ | 42.0 | 17.3 | 1.2 | 1 | 7.409 | 3266 | 2.83 | 0.24 |
| 60722-S1 | Isobutane | 36.8 | 10.6 | 1.2 | 5 | 9.480 | 3822 | 4.04 | 0.37 |
| 960722-S2 | Isobutane | 35.2 | 8.7 | 1.2 | 5 | 9.480 | 3822 | 4.75 | 0.44 |
| 960723-S1 | Isobutane | 35.2 | 11.8 | 1.2 | 5 | 9.480 | 3822 | 3.48 | 0.32 |
| 960723-S2 | Isobutane | 30.4 | 10.2 | 1.2 | 5 | 9.480 | 4108 | 3.47 | 0.30 |
| 960723-S3 | Isobutane | 35.2 | 10.2 | 1.2 | 5 | 9.480 | 4134 | 4.02 | 0.34 |
| 960723-T1 | $CO_2$ | 47.4 | 7.9 | 1.2 | 1 | 7.409 | 6961 | 7.03 | 0.28 |
| 960723-T2 | $CO_2$ | 45.8 | 10.2 | 1.2 | 1 | 7.409 | 6961 | 5.22 | 0.21 |
| 960723-T3 | $CO_2$ | 46.0 | 10.2 | 1.2 | 1 | 7.409 | 6961 | 5.24 | 0.21 |
| 960723-T4 | $CO_2$ | 42.0 | 13.4 | 1.2 | 1 | 7.409 | 6961 | 3.66 | 0.14 |
| 960724-T1 | $CO_2$ | 45.8 | 11.8 | 1.2 | 1 | 7.409 | 6974 | 4.53 | 0.18 |
| 960724-T2 | $CO_2/H_2O$ | 45.0 | 10.2 | 1.2 | 1 | 7.409 | 6974 | 5.13 | 0.20 |
| 960725-T1 | $CO_2/N_2$ | 57.8 | 20.5 | 1.2 | 1 | 7.409 | 7103 | 3.30 | 0.13 |
| 960725-T2 | $CO_2/N_2$ | 56.5 | 15.0 | 1.2 | 1 | 7.409 | 7103 | 4.41 | 0.17 |
| 960731-T1 | $CO_2$ | 47.9 | 7.1 | 1.2 | 1 | 7.409 | 7047 | 7.89 | 0.31 |
| 960801-T1 | $CO_2$ w/ PEG 8000 | 42.1 | 12.6 | 1.2 | 1 | 7.409 | 7133 | 3.90 | 0.15 |
| 960801-T2 | $CO_2$ w/ PEG 8000 | 38.0 | 15.7 | 1.2 | 1 | 7.409 | 7133 | 2.81 | 0.11 |
| 960801-T3 | $CO_2$ w/ PEG 8000 | 37.8 | 13.4 | 1.2 | 1 | 7.409 | 7133 | 3.29 | 0.13 |
| 960805-T1 | $CO_2$ | 106.4 | 23.6 | 1.2 | 1 | 7.409 | 7047 | 5.25 | 0.20 |
| 960805-T2 | $CO_2$ | 81.1 | 20.5 | 1.2 | 1 | 7.409 | 7047 | 4.62 | 0.18 |
| 960806-T1 | $CO_2$ | 90.5 | 23.6 | 1.2 | 1 | 7.409 | 7133 | 4.47 | 0.17 |
| 960806-T2 | $CO_2$ | 116.8 | 23.6 | 1.2 | 1 | 7.409 | 7133 | 5.77 | 0.22 |
| 960806-T3 | $CO_2$ | 96.4 | 22.0 | 1.2 | 1 | 7.409 | 7133 | 5.10 | 0.20 |
| 960807-T1 | $CO_2$ | 66.6 | 22.0 | 1.2 | 1 | 7.409 | 7181 | 3.53 | 0.13 |
| 960815-T1 | $CO_2/Ar$ | 54.0 | 22.0 | 1.2 | 1 | 7.409 | 6662 | 2.86 | 0.12 |
| 960828-T1 | Isobutane | 44.1 | 10.2 | 1.2 | 1 | 7.409 | 4657 | 5.02 | 0.30 |
| 961002-S1 | CO2/H2O w/Polyglycerol | 38.4 | 11.0 | 1.2 | 1 | 7.409 | 6315 | 4.07 | 0.18 |
| 961002-S2 | CO2/H2O w/Polyglycerol | 32.4 | 9.4 | 1.2 | 1 | 7.409 | 6315 | 4.00 | 0.17 |
| 961002-S3 | CO2/H2O w/Polyglycerol | 28.7 | 10.2 | 1.2 | 1 | 7.409 | 4727 | 3.27 | 0.19 |
| 961003-S2 | CO2/H2O w/Polyglycerol | 32.7 | 14.2 | 1.2 | 1 | 7.409 | 6398 | 2.69 | 0.12 |
| 961009-S2 | CO2/H2O w/Polyglycerol & PEO | 30.4 | 10.2 | 1.2 | 1 | 7.409 | 6051 | 3.47 | 0.16 |
| 961108-S1 | CO2/H2O w/Polyglycerol | 44.9 | 13.4 | 1.2 | 1 | 7.409 | 8165 | 3.91 | 0.13 |

NOTE: DIE TYPES
1 Radial Die Dimensions
Width = 19.1 cm
Depth = 5.7 cm

TABLE 1-continued

PROCESS INVENTION RUN DATA

| Run ID | Blowing Agent Type | ρ [Foam Density] (kg/m³) | C [Linear Cell Density] (cells/cm²) | tan δ [Loss Tangent] | Die Type | A [Die Cross Section Area] (cm²) | Q [Instantaneous Die Extrusion Rate] (kg/hr) | Park Foamability Index | Ebullition Time (10⁻⁴ sec) |
|---|---|---|---|---|---|---|---|---|---|

Gap = 0.318 cm
Area = 7.4090 cm2
2 Small Slot Die Dimensions
Width = 19.7 cm
Gap = 0.318 cm
Area = 7.8100 cm2
3 Large Slot Die Dimensions
Width = 20.0 cm
Gap = 0.476 cm
Area = 12.0600 cm2
4 "Smile" Die A Dimensions
Width = 20.3 cm
Gap == 0.556 cm
Area == 14.1300 cm2
5 "Smile" Die B Dimensions
Width = 20.3 cm
Gap = 0.397 cm
Area = 9.4800 cm2

FIG. 2 provides a comparison of the process invention data reported in Table 1 with the Foamability Index relationship advocated by U.S. Pat. No. 5,527,573 (Park et al.). The hollow circle points on the graph indicate sample data for trial runs where the blowing agent was 100 percent commercial grade carbon dioxide. The solid diamond points indicate data for samples which were made with 100 percent commercial grade isobutane. The shaded triangle points indicate data for samples which were made with a blowing agent other than either 100 percent commercial grade carbon dioxide or 100 percent commercial grade isobutane, such as with a blend of carbon dioxide and nitrogen. The solid line depicts the upper boundary of the closed cell region defined by the Park Foamability Index relationship for a propylene polymer blend with a loss tangent (tan L) equal to 1.2 at 1.0 radians/sec frequency and 190° C.

Table 1 summarizes the data for a variety of trial runs of the process invention. The table reports the trial parameters of the measured foam density (D) in kg/m³, the measured linear count cell density (C) in cells/cm, the Loss Tangent (tan L) for the resin, the measured die exit area (A) in cm², and the measured die extrusion rate (Q) in kg/hr. Table 1 also provides the calculated Foamability Index according to the relationship defined by U.S. Pat. No. 5,527,573 (Park et al.) in the units of pcf-mm, by using the conversion generated in ASTM test method D3576 for cell size measurement. Additionally, Table 1 reports the calculated Ebullition Time for each trial sample run.

The invention of a short time frame process for producing extruded, closed cell, low density propylene polymer foams, therefore, has two predictors for desirable foaming. The polymer rheological properties and the final foam structural characteristics make up the first predictor, a Foamability Index (FI) in excess of 1.9, as defined earlier. As noted previously, the time dependent response of the process is also important in the present invention. A fundamental foaming time, called Ebullition Time, is the second predictor. Desirable foaming occurs when the Ebullition Time (ET) is less than $2.0 \times 10^{-4}$ seconds, as defined earlier. Preferably, the foamability index exceeds 3.0, and the ebullition time is less than $1.5 \times 10^{-4}$ seconds.

The nucleating agent (or cell size control agent) can be any conventional or useful nucleating agent(s). The cell size agent is preferably used in amounts of 0.1 to 2.0 weight percent, depending upon the desired cell size, and based upon the weight of the propylene polymer resin. Examples of the cell size control agents are inorganic materials (in small particulate form), such as, clay, talc, silica and diatomaceous earth. Additional examples include organic cell size-controlling agents which decompose or react at the heating temperature within the extrude to evolve gas, such as a combination of an alkali metal salt of a polycarboxylic acid, such as, sodium hydrogen tartrate, potassium hydrogen succinate, sodium citrate, potassium, citrate and sodium oxalate, (or a polycarboxylic acid such as citric acid), with a carbonate or bicarbonate, such as, sodium carbonate, sodium bicarbonate, potassium carbonate, potassium carbonate and calcium carbonate. A combination of a monoalkali metal salt of a polycarboxylic acid, such as, monosodium citrate and monosodium tartrate, with a carbonate or bicarbonate is an example. The preferred cell size control agents are talc or a stoichiometric mixture of citric acid and sodium bicarbonate (the mixture having a 1 to 100 percent concentration where the carrier is a suitable polymer such as low density polyethylene or polypropylene). Mixtures of more than one type of cell size control agent can be used.

Additional additives and modifiers can include one or more stabilizers, pigments, or processing enhancers. "Stabilizers" are those materials which can impart ultraviolet light absorption or flame retardancy, or which can serve as antioxidants. Stabilizers are generally added as concentrates made with polyolefinic resin carriers. The usual loadings are up to 5 weight percent of the active stabilizer in the propylene polymer feed. Examples of acceptable UV absorbers include hindered amines and benzotriazoles. Examples of acceptable antioxidants include pentaerythritol diphosphites and high molecular weight hindered phenolics. Examples of acceptable flame retardants include antimony trioxide-brominated epoxy oligomer blends, bromodiphenyl oxides, and alumina trihydrate. "Pigments" are those materials which impart color or serve primarily as property modifiers in the foam matrix. These materials also generally are added as concentrates made with polyolefinic resin carriers, and are added at loadings up to 15 weight percent active component in the propylene polymer resin feed. Examples include titanium dioxide, mica, carbon black and various organic pigments. The particle size of each of these various additives is chosen to minimize or eliminate nucleation in the foam process. "Processing enhancers" include those materials which improve extrusion stability, lower pressure drop, modify undesirable shear induced phenomena like melt fracture, or impart desirable characteristics to the extruded foam plank. These materials are added at loadings up to 2 weight percent either as direct solids or in concentrates. Examples of processing enhancers include low molecular weight polyolefinic waxes, stearic acid, metallic stearates, glycerides, powdered flouropolymers, and various silicone derivatives.

Both organic and inorganic halogen-free blowing agents and mixtures thereof can be used in the invention process. The inorganic, halogen-free blowing agents are those which are environmentally acceptable and nonflammable. The organic blowing agents are those which are environmentally acceptable, but which may be classified as flammable.

The preferred inorganic blowing agents are the inorganic atmospheric gases and those other compounds which are chemically non-reactive at the extruder conditions. Examples of the preferred inorganic blowing agents include argon, carbon dioxide, water, nitrogen, neon, helium, krypton, nitrous oxide, and sulfur hexafluoride (but not, for example, oxygen, ozone, sulfur dioxide, or nitric oxide). The most preferred inorganic blowing agents are carbon dioxide and argon. Inorganic blowing agent blends which contain a major fraction of carbon dioxide are the most preferred blowing agent mixtures. When two or more blowing agents are used, they are preferably injected individually into separate injection ports, but they can be injected together into the same injection port of the mixing extruder. When the blowing agent is argon, it is used at a rate of 0.1 to 4 weight percent (but preferably at a rate of 0.1 to 2.0 weight percent) of the total extruder flow rate. When the blowing agent is carbon dioxide, it is used at a rate of 0.5 to 7.0 weight percent (but preferably at a rate of 0.5 to 5.0 weight percent) of the total extruder flow rate. When the blowing agent is nitrogen in combination with carbon dioxide, it can be used at a rate of 0.1 to 1.5 weight percent of the total extruder flow rate.

Organic blowing agents include both fully hydrogenated hydrocarbons and partially fluorinated hydrocarbons, known as HFCs', HCFCs' or CFCs'. Under current Federal laws, the use of most CFCs' and some HCFCs' is prohibited in products which might be made by this process and, thus, their application in the process invention would have been restricted. However, HCFCs' can be used for insulation products made by this process invention.

The preferred fully hydrogenated hydrocarbon blowing agents are the initial members of the alkane series of hydrocarbons which contain up to five carbon atoms and which are not regulated by governmental agencies as being specifically toxic to human or plant life under normal exposure. That is, the preferred fully hydrogenated hydrocarbon blowing agents are methane, ethane, propane, n-butane, isobutane, n-pentane and isopentane (but not neopentane). Neopentane could be used in the invention process, but its toxicity to human life necessitates the use of elaborate control technology and, thus, removes it from the preferred blowing agent list. The most preferred organic blowing agent is isobutane. Isobutane can be used at a rate of 1 to 18 weight percent of the total extruder flow rate, but is preferably used at a rate of 3 to 15 weight percent of the total extruder flow rate.

The preferred partially fluorinated hydrocarbon blowing agents are those which have molecules which contain up to three carbon atoms and which do not contain any other halogen atoms, such as, 1,1-difluoroethane (HFC-152a), 1,1,1-trifluoroethane (HFC-143a), 1,1,1,2-tetrafluoroethane (HFC-134a), and 1,1,2,3,3-pentafluoropropane (HFC-245fa). The most preferred partially fluorinated hydrocarbon blowing agent is HFC-134a. HFC-134a is used at a rate of 1.0 to 5.0 weight percent of the total extruder flow rate.

The preferred blend of organic and inorganic blowing agents contains carbon dioxide as the inorganic blowing agent. The most preferred blend of both an organic and an inorganic blowing agent is isobutane with carbon dioxide.

The term "compatibilizing agent", as used herein, is meant to include those materials that are used in conjunction with either an inorganic blowing agent, a blend of inorganic blowing agents, or a blend of organic and inorganic blowing agents (1) to sufficiently plasticize the thermoplastic extrudate within the extruder so as to maintain die melt temperatures sufficiently low to produce a closed cell foam structure and (2) which will have sufficient affinity for the inorganic physical blowing agent to limit the subsequent foaming rate at the extrusion die with the physical blowing agent or blowing agent blend. Chemical compounds that have been found to meet this criteria with the propylene polymer foams produced by this invention are those materials which have a structure containing multiple ether bonds and which may also contain multiple hydroxyl bonds. Compatibilizing agents for the invention include organic compounds such as polyglycols, polyglycol ethers, polyethylene oxides, and polyglycerols.

Polyglycols include those that are short-chain polymers of ethylene oxide, which may have either a branched or linear molecular structure with a molecular weight of less than about 20000. Those polyglycols with a linear structure include polyethylene glycols, such as triethylene glycol, tetraethylene glycol, pentaethylene glycol, hexaethylene glycol. The polyglycols with a branched structure are generally referred to by their average molecular weight. The preferred branched polyglycols have an average molecular weight between about 200 and about 20000, more preferably polyethylene glycol with an average molecular weight of about 8000, which is abbreviated herein as "PEG-8000". Polyethylene glycol may be prepared for use in the invention by liquifying at ambient pressure by heating in an open vessel above about 63° C.

Polyglycol ethers include the monomethyl or dimethyl ethers of those polymers of ethylene oxide, which may have either a branched or linear structure with a molecular weight of less than about 10000. Polyglycol ethers with a linear structure include tetraethylene glycol dimethyl ether, tripropylene glycol dimethyl ether, diethylene glycol dibutyl ether, and poly(ethylene glycol)dimethyl ether. A preferred linear polyglycol ether is tetraethylene glycol dimethyl ether. The polyglycol ethers with a branched structure are generally referred as the methoxy ether or dimethoxy ether of a polyethylene glycol of a specific average molecular weight. Preferred branched polyglycol ethers are methoxy ethers of polyethylene glycol having an average molecular weight between about 350 to about 5000. A more preferred branched polyglycol ether is methoxy ether of polyethylene glycol with an average molecular weight of about 5000.

Longer chain polymers of ethylene oxide are generally referred to as polyethylene oxides or PEO's. Many of the commercially available polyethylene oxides have a linear structure and a molecular weight greater than about 200,000. The polyethylene oxides permissible in the invention process have a molecular weight between about 200,000 and about 1,000,000. Polyethylene oxides function in the invention when water is included as part of the physical blowing agent blend. A preferred polyethylene oxide for use in the invention has an average molecular weight of about about 300,000.

Polyglycerols of use in the invention include those short chain polymers of glycerol which generally have a linear structure. Unlike the polyglycol or polyglycol ethers, and similar to the polyethylene oxides, the polyglycerols have been found to function in the invention process when water is included in the extruded foamable composition. Preferred polyglycerols have an average molecular weight less than about 800. A preferred means of addition of the polyglycerol is in an aqueous solution having a concentration range of about 25 to 75 percent by weight of the polyglycerol, preferably about 50 percent by weight of the polyglycerol. A preferred amount of compatibilizing agent used is about 0.2 to 1.0 weight percent of the total extruder flow rate. A preferred polyglycerol contains 50 percent or more triglycerol (4,8-dioxa-1,2,6,10,11-undecanepentol).

Preferred polyglycerol solutions include a 20 to 80 weight percent aqueous solution of a polyglycerol that has an average molecular weight between 230 and 250 and which contains greater than 50 weight percent triglycerol and a 20 to 80 weight percent aqueous solution of a polyglycerol that has an average molecular weight between 380 and 400 and which contains greater than 60 weight percent hexaglycerol.

Of the four categories of compatibilizing agents described above, the most preferred compatibilizing agent for use with a physical blowing agent which is predominately carbon dioxide is a 48–52 percent by weight aqueous solution of a polyglycerol of average molecular weight of about 240 and which contains at least 50 percent triglycerol.

The process can be operated on an intermittent basis to produce large or thick propylene polymer foam (e.g., planks) using an extruder-accumulator system, such as that which is disclosed in U.S. Pat. No. 4,323,528 (Collins), the pertinent parts of which are incorporated herein. First, a foamable mixture is prepared in the mixing zone of an extruder. The foamable mixture is cooled to a temperature near the melting point of the propylene polymer blend, and is introduced into the holding zone of an accumulator. The holding zone is maintained both at a temperature in the preferred range of 170° C. to 180° C. and at a pressure in the range of 2.7 to 10.3 MPa, conditions which do not allow the foamable mixture to foam. The holding zone is equipped with an outlet die having an orifice which opens into a zone of lower pressure, such as the atmosphere. The die orifice can be open or closed, preferably by a gate which is external to the holding zone. The movement of the gate does not in any way disturb or physically affect the foamable mixture within the holding zone, other than to release it to the atmosphere when the gate is opened.

The ejection rate, that is, the time necessary to empty the holding chamber of the accumulator can be varied widely. Ejection rates as lows as 1000 kg/hr to about 8500 kg/hr, preferably 2500 kg/hr to about 7300 kg/hr, can be used. Ejection rates are dependent upon many factors, including compositional factors, such as, the particular thermoplastic propylene polymer resin formulation being employed, the particular blowing agent and the amount thereof being employed, the amount of nucleating agent used, and the amount of other special purpose additives used. Ejection rates are also influenced by the temperature of the molten foamable mixture, the pressure in the holding chamber, the force and speed with which the ram is moved, and the size and shape of the die orifice. The optimum rate of ejection to produce the desired cell body having the desired characteristics and size can be readily arrived at for any particular composition of molten foamable mixture and for any particular equipment by making a few adjustment runs.

The molten foamable mixture begins to expand as soon as it exits the die orifice of the accumulator and enters the zone of lower pressure. The cellular body is preferably supported by means of a conveyor system of some type (for example, a conveyor belt or a conveyor roller) from the time ejection begins until the time that ejection terminates. The ejected, foaming molten mixture continues to expand throughout the entire ejection operation, which normally takes from less than one second to several seconds, and continues to expand even after the ejection operation has been completed. The expansion of the cellular body continues for several to a few minutes after ejection is completed, indicating that the body is still deformable. When it is in an expanding or deformable condition, it can be further shaped, for example, by transfer molding or simply by altering one or more or all surfaces of the expanding cellular body. After a period of time, the cellular body ceases to expand any further, which indicates that cooling has taken place to the extent that the body is no longer totally deformable.

The process can also be operated on a continuous basis using a large size conventional foam extrusion system which can provide sufficient residence time and melt cooling and an ebullition time of less about than $2.0 \times 10^{-4}$ second with the die configuration which is employed.

The propylene polymer foams produced by the invention process have sufficient melt strength to prevent cell collapse during the foam expansion.

The thermoplastic propylene polymer cellular bodies produced by this invention generally have a density below 150 kg/m$^3$ and are considered to be of low density. The propylene polymer cellular bodies produced by the invention process are of substantially consistent cross-section throughout their lengths. The length of such bodies in the intermittent process can be varied from about 1 meter to 15 or more meters depending upon the size and capacity of the equipment, in particular, depending upon the size and capacity of the holding chamber and of the conveyor system. The propylene polymer cellular bodies of the invention are capable of being produced with consistently uniform physical properties from run to run in commercial production equipment.

The propylene polymer cellular bodies provided by the invention are light in weight and are useful as cushioning materials to package delicate goods, such as, computers, glassware, televisions, furniture, and any article which needs to be protected form shock, gouging, or surface-scratching or marring.

The propylene polymer cellular bodies provided by the invention are also strong, with high toughness, and provide an energy absorbing substrate which can be used for high speed impact production in automotive and other vehicle parts.

The combination of being light weight and being stiff makes the propylene polymer cellular material useful for a wide range of applications, such as, for high performance surfboards, insulation products, and acoustical structures.

The preferred embodiment of the invention is detailed below.

Pellets of high melt strength polypropylene resin having a density in the range of 900 to 910 kg/m³ and a Melt Flow Index in the range of 2.0 to 4.0 g/10 min (ASTM Condition L) are co-fed into an extruder hopper with 0.5 to 2.0 weight percent pellets of a nominal 20 percent active ingredient crystalline silica concentrate which is based in a low-density polyethylene. The pellet blend is melted in a 32:1 L:D (i.e., length:diameter) single screw extruder, and is compressed by the screw to a pressure of about 1.25 MPa. Through one injection port, which is located approximately 16 diameter lengths downstream of the extruder pellet feed throat, carbon dioxide which has been pressurized to 1.75 MPa is regulated through a control valve for delivery at about 3 to 6 percent of the total extruder flow rate, depending upon the target density. If the target density is below about 45 kg/m³, an aqueous solution containing 50 weight percent of a polyglycerol that has an average molecular weight of about 240 and that is at least 50 percent by weigh triglycerol is pressurized and regulated into the extruder at a rate of about 1 to 1.5 percent of the total extruder flow rate through a separate injection port which is located either 90° or 180° radially from the port used for carbon dioxide.

Immediately downstream of the injection port, the extruder screw is equipped with a mixing section containing at least four screw-diameter lengths of multiple, highly-pitched, segmented flights. The carbon dioxide, water, and the polyglycerol are mixed into the pressurized melted material in the mixing zone. The molten extrudate is compressed in the final stages of the extruder to 14.1 to 14.5 MPa and, subsequently, is fed through a heated pipe into a secondary extruder.

The secondary extruder is any one which has been specifically designed to accept molten polymer feeds. It should have a flighted screw length equivalent to at least 24 of its screw diameters, with equivalence to 32 diameters being the preferred length. The ratio of the screw diameter of the secondary extruder to the screw diameter of the first extruder preferably should be greater than 1.25. The preferred screw design for optimal melt cooling has four parallel flights radially spaced by 90°, with a cross-cut segment with a length of about one-third of the screw diameter missing from each flight and with a repeat length equivalent to four screw diameters.

In the secondary extruder, the extruder barrel temperatures are maintained to deliver a melt temperature in the range of 150° C. to 170° C., with the ideal melt temperature depending upon the propylene polymer blend employed. The pressure at the head of the extruder should be maintained at 9.3 to 11.3 MPa if an optional gear pump is present, or it will be at about 17.5 to 19.5 MPa if there is no gear pump present.

The cooled, pressurized molten mixture of propylene polymer, carbon dioxide, water, and polyglycerol is pumped through a pipe into a hydraulically-pressurized piston chamber which is set to maintain a melt pressure of about 12.4 MPa. The various zones of the chamber are externally cooled by forced convection air to the range of 160° to 165° C.

The specific details of the piston process are disclosed in U.S. Pat. No. 4,323,528 (Collins). In summary, as the volume of the molten mixture fills the piston chamber, the piston plunger moves. When the piston plunger moves a predefined distance, a switch actuates both the drive system and the gate system for the cylinder. For the invention process, the drive mechanism is set to move the plunger at a predefined speed, so as to dispel the material through the radial die at a rate of about 7000 kg/hr. The discharged material expands rapidly in all three directions as it leaves the die, but is captured on a conveyor table equipped to move the expanded mass sufficiently both to clear the die and to control the expansion of the material in the thickness and machine directions. The resultant foam block is left in the table long enough for the next advance of the plunger. The foam block is placed upon additional cooling racks and allowed to cool sufficiently for handling, typically for 15 minutes to one hour.

The following non-limiting examples are intended to be illustrative of the invention. Example 1 details a preferred embodiment of the invention for the intermittent process which can produce large cross section propylene polymer foam with carbon dioxide at a density of about 45 kg/m³. Example 2 is similar to Example 1, but has a higher density target of about 96 kg/m³ with a moderately fine cell structure. Example 3 shows the results of a run with a carbon dioxide and nitrogen blend. Example 4 provides the results of the run when a 50 percent by weight aqueous solution of a polyglycerol of average molecular weigh of about 240 is used to produce foam with carbon dioxide at a density target lower than that of Example 1 but on a different extruder. Example 5 is similar to Example 4 but adds a polyethylene oxide of average molecular weight 300,000. Examples 6, 7, 8 and 9 detail various runs made with isobutane as the blowing agent and with different blends of propylene homopolymer with other resins.

EXAMPLE 1

Pellets of Montell Polypropylene PF814 (specific gravity, 0.90 to 0.91 g/cm³; melt index, 2 to 4 grams/10 minutes) mixed with Schulman F20V crystalline silica concentrate based in low density polyethylene are heated in a modified, 32:1 L:D, Berlyn, 2.5-inch (63.5 mm) single-screw extruder operating at a screw speed of 48.3 rpm. Commercial-grade, 99.8 percent purity carbon dioxide, which has been pressurized, is injected at a pressure of about 13.1 MPa, at a rate of 1.6 kg/hr. The three-component mixture, subsequently, is pressurized to 9.4 MPa at the extruder discharge, and is transferred through a heated pipe to a second, larger 3.5-inch (89 mm) single screw cooling extruder. The mixture is cooled in the cooling extruder to a melt temperature of about 172° C., at 7.0 MPa. The secondary extruder head pressure is regulated by a Normag 2200 gear pump system. The melt pump increases the pressure of the melt to 7.43 MPa for delivery at 37 kg/hr into the cooled hydraulically pressurized piston chamber. When the fill of the material moves the piston to a predefined distance, a switch actuates both the drive system and the gate system for the cylinder, to dispel the material through the radial die at a rate of about 6975 kg/hr. Samples of the resulting foam block have a fresh density of 45.8 kg/m³ and a linear cell density of about 12 cells/cm. The foam has less than 10 percent of open cells. The foam is characterized by both a foamability index of 4.53 and an ebullition time of 0.18×10⁻⁴ sec.

EXAMPLE 2

Pellets of Montell Polypropylene PF814 mixed with Techmer 1901-T Talc concentrate based in low density polyethylene are heated in a modified, 32:1 L:D, Berlyn, 2.5-inch (63.5 mm) single-screw extruder operating at a screw speed of 47.9 rpm. Commercial-grade, 99.8 percent purity carbon dioxide, which has been pressurized, is injected at a pressure of about 13.1 MPa, at a rate of 0.54 kg/hr. The three-component mixture, subsequently, is pressurized to 11.4 MPa at the extruder discharge, and is transferred through a heated pipe to a second, larger 3.5-inch (89 mm) single screw cooling extruder. The mixture is cooled in the cooling extruder to a melt temperature of about 177° C., at 8.2 MPa. The secondary extruder head pressure is regulated by a Normag 2200 gear pump system. The melt pump maintains the pressure of the melt at 8.2 MPa for delivery at 37 kg/hr into the cooled hydraulically pressurized piston chamber. When the fill of the material moves the piston to a predefined distance, a switch actuates both the drive system and the gate system for the cylinder, to dispel the material through the radial die at a rate of about 7135 kg/hr. Samples of the resultant foam block have a fresh density of 96.4 kg/m$^3$ and a linear cell density of about 22 cells/cm. The foam has less than 10 percent of open cells. The foam is characterized by both a foamability index of 5.10 and an ebullition time of $0.20 \times 10^{-4}$ sec.

EXAMPLE 3

Pellets of Montell Polypropylene PF814 are heated in a modified, 32:1 L:D, Berlyn, 2.5-inch (63.5 mm) single-screw extruder operating at a screw speed of 47.9 rpm. Commercial-grade, 99.8 percent purity carbon dioxide, which has been pressurized, is injected at a pressure of about 13.1 MPa, at a rate of 0.91 kg/hr. Commercial-grade, 99.8 percent purity nitrogen, which has been pressurized, is injected at a pressure of about 13.1 MPa, at a rate of 0.68 kg/hr. The three-component mixture, subsequently, is pressurized to 11.1 MPa at the extruder discharge, and is transferred through a heated pipe to a second, larger, 3.5-inch (89 mm), single screw cooling extruder. The mixture is cooled in the cooling extruder to a melt temperature of about 174° C., at 9.3 MPa. The secondary extruder head pressure is regulated by a Normag 2200 gear pump system. The melt pump increases the pressure of the melt to 12.8 MPa for delivery at 36 kg/hr into the cooled, hydraulically pressurized piston chamber. When the fill of the material moves the piston to a predefined distance, a switch actuates both the drive system and the gate system for the cylinder, to dispel the material through the radial die at a rate of about 7105 kg/hr. Samples of the resultant foam block have a fresh density of 56.5 kg/m$^3$, and a linear cell density of about 15 cells/cm. The foam has less than 10 percent of open cells. The foam is characterized by both a foamability index of 4.41 and an ebullition time of $0.17 \times 10^{-4}$ sec.

EXAMPLE 4

Pellets of Montell Polypropylene PF814 mixed with Techmer 1901-T Talc are heated in a 48:1, L:D, Wilmington, 3.0 inch (76 mm) single screw extruder operating at 47 revolutions per minute. Commercial grade carbon dioxide, pressurized to 14.5 MPa, is added to the melted polymer through an injection port in the second zone of the extruder at 2.2 parts per hundred by weight of polymer. Through a separate injection port that is located 90° radially from the one used for carbon dioxide, a premixed solution which contains equal weights of Hexagon Enterprises, Incorporated Hexapol G-3 polyglycerol and tap water is pressurized and added at a rate of 0.62 weight percent of the foam extrudate rate. The carbon dioxide blowing agent, aqueous polyglycerol compatibilzing agent solution, and melted polymer blend are mixed and, subsequently, are cooled to a melt temperature of 159° C. The extruder head pressure is regulated by a Normag 2200 gear pump system which subsequently delivers the melt to a temperature controlled, hydraulically pressurized piston chamber at a pressure of 9.0 MPa. When the material filling the chamber moves the piston a predefined distance, a limit switch activates both the drive system and the die gate system, allowing the cylinder to eject the material through a radial die having a cross sectional area of 7.409 cm$^2$, at a rate of 6315 kg/hr. Samples of the resultant foam plank have a fresh density of 32.4 kg/m$^3$ and a linear cell count density of 9.4 cells/cm. The foam has less than 10 percent of open cells. The foam is characterized by both a foamability index of 4.0 and an ebullition time of $0.17 \times 10^{-4}$ seconds.

EXAMPLE 5

In this variation of Example 4, Union Carbide Poly-Ox WSR-N750 is added to the formulation. The injection rate of carbon dioxide is increased to 2.6 parts per hundred by weight of polymer. The carbon dioxide blowing agent, aqueous polyglycerol/polyethylene oxide compatibilzing agent combination, and melted polymer blend are mixed and, subsequently, are cooled to a melt temperature of 148° C. The injection rate through the die is increased to a rate of 6685 kg/hr. Samples of the resultant foam plank have a fresh density of 30.4 kg/m$^3$ and a linear cell count density of 10.2 cells/cm. The foam has less than 10 percent of open cells. The foam is characterized by both a foamability index of 3.47 and an ebullition time of $0.16 \times 10^{-4}$ seconds.

EXAMPLE 6

A resin blend of 90 percent by weight of Montell HMS Polypropylene PF814, 10 percent by weight of Montell Ethylene-Propylene Copolymer KS351P (10 to 20 weight percent of ethylene monomer; specific gravity, about 0.903 g/cm$^3$; and melt index, about 3 grams/10 minutes) and 0.65 parts per hundred of a 50 percent talc concentrate based in low density polyethylene is added to the feed hopper of a 48:1, L:D, Wilmington, 3.0 inch (76 mm) single screw extruder operating at 37 revolutions per minute. Isobutane, pressurized to 13.8 MPa, is added to the melted polymer through an injection port in the second zone of the extruder at 1.25 parts per hundred by weight of polymer. The isobutane blowing agent and melted polymer blend are mixed and, subsequently, are cooled to a melt temperature of 155° C. The extruder head pressure is regulated by a Normag 2200 gear pump system which subsequently delivers the melt to a temperature controlled, hydraulically pressurized piston chamber at a pressure of 6.2 MPa. When the material filling the chamber moves the piston a predefined distance, a limit switch activates both the drive system and the die gate system, allowing the cylinder to eject the material through a straight slot dogbone die having a cross sectional area of 12.06 cm$^2$, at a rate of 4082 kg/hr. Samples of the resultant foam plank have a fresh density of 92.3 kg/m$^3$ and a linear cell count density of 8.3 cells/cm. The foam has less than 10 percent of open cells. The foam is characterized by both a foamability index of 13.0 and an ebullition time of $1.42 \times 10^{-4}$ seconds.

EXAMPLE 7

In this variation of Example 5, a resin blend of 70 percent by weight of Montell HMS Polypropylene PF814, 30 percent by weight of Montell Ethylene-Propylene Copolymer KS351P and 0.65 parts per hundred of the 50 percent talc concentrate is added to the feed hopper of the extruder. Isobutane is added at 2.13 parts per hundred by weight of the polymers, and the mixture is cooled to a melt temperature of 159.4° C. Samples of the resultant foam plank have a fresh density of 75.3 kg/m³ and a linear cell count density of 5.1 cells/cm. The foam has less than 10 percent of open cells. The foam is characterized by both a foamability index of 17.2 and an ebullition time of $1.88 \times 10^{-4}$ seconds.

EXAMPLE 8

A resin blend of 90 percent by weight of Montell HMS Polypropylene PF814, 10 percent by weight of Montell Ethylene-Propylene Copolymer KS351P and 1.00 parts per hundred of a 50 percent talc concentrate based in low density polyethylene is added to the feed hopper of a 48:1 L/D, Wilmington, 3.0 inch (76 mm) single screw extruder operating at 37 revolutions per minute. Isobutane, pressurized to 13.8 MPa, is added to the melted polymer through an injection port in the second zone of the extruder at 6.25 parts per hundred by weight of polymer. The isobutane blowing agent and melted polymer blend are mixed and, subsequently, are cooled to a melt temperature of 151.7° C. The extruder head pressure is regulated by a Normag 2200 gear pump system which subsequently delivers the melt to a temperature controlled, hydraulically pressurized piston chamber at a pressure of 5.8 MPa. When the material filling the chamber moves the piston a predefined distance, a limit switch activates both the drive system and the die gate system, allowing the cylinder to eject the material through a curved slot dogbone die having a cross sectional area of 9.48 cm², at a rate of 4222 kg/hr. Samples of the resultant foam plank have a fresh density of 30.4 kg/m³ and a linear cell count density of 12.6 cells/cm. The foam has less than 10 percent of open cells. The foam is characterized by both a foamability index of 2.82 and an ebullition time of $0.23 \times 10^{-4}$ seconds.

EXAMPLE 9

In this variation of Example 7, a resin blend of 72 percent by weight of Montell HMS Polypropylene PF814, 10 percent by weight of Montell Ethylene-Propylene Copolymer KS351P, 18 percent by weight of Dow Polyolefin Elastomer Engage EG8100 (ultra low density polyethylene elastomer, made with a special catalyst; density, about 0.86 to 0.89 g/cm³), and 1.00 parts per hundred of the 50 percent talc concentrate are added to the feed hopper of the extruder. Isobutane is added at 6.25 parts per hundred by weight of polymer, and the mixture is cooled to a melt temperature of 148.3° C., and ejected through the die at 4138 kg/hr. Samples of the resultant foam plank have a fresh density of 30.4 kg/m³ and a linear cell count density of 10.2 cells/cm.

The foam has less than 10 percent of open cells. The foam is characterized by both a foamability index of 3.47 and an ebullition time of $0.30 \times 10^{-4}$ seconds.

What is claimed is:

1. A short time frame extrusion foaming process for producing a closed-cell propylene polymer foam, comprising the steps of:
   (a) feeding a propylene polymer resin into an extruder;
   (b) adding a nucleating agent to the resin feed;
   (c) plasticating the mixture in an extruder to form a polymeric melt;
   (d) incorporating at least one member selected from the group consisting of at least one organic blowing agent, at least one inorganic blowing agent and blends thereof, into the polymeric melt to form a foamable composition;
   (e) uniformly mixing and cooling the foamable composition to a temperature effective for the expansion of the low-density propylene polymer foam; and
   (f) extruding or ejecting the foamable composition mixture through a die at a sufficiently high rate to form a low density closed-cell propylene polymer foam characterized by a Foamability Index greater than 1.9 and an Ebullition Time less than $2.0 \times 10^{-4}$ seconds.

2. The process as claimed in claim 1 wherein the propylene polymer foam has a density between 10 and 150 kg/m³.

3. The process as claimed in claim 1 wherein the propylene polymer foam has a thickness greater than 1.3 cm.

4. The process as claimed in claim 1 wherein the propylene polymer resin has greater than 50 percent by weight of a branched molecular structure polypropylene.

5. The process as claimed in claim 1 wherein the propylene polymeric resin has a specific gravity of 900 to 910 kg/m³ with a melt index in the range of 0.6 to 10.0 grams per 10 minutes.

6. The process as claimed in claim 1 wherein the propylene polymeric resin is less than 50 weight percent of a propylene-ethylene copolymer containing less than 20 weight percent of ethylene.

7. The process as claimed in claim 1 wherein a polymeric modifier is added to the resin feed.

8. The process as claimed in claim 7 wherein the polymeric modifier is selected from the group consisting of (i) a polyethylene polymer having a density less than 0.90 g/cc, (ii) a polyethylene polymer having a molecular weight in excess of 600,000, (iii) a styrene-butadiene copolymer, and (iv) an ethylene-propylene diene monomer copolymer rubber, such that the propylene monomer content is greater than 70 weight percent.

9. The process as claimed in claim 1 wherein the nucleating agent is added at 0.1 to 2.0 weight percent, based upon the total propylene polymer and depending upon the desired cell size, and is selected from the group consisting of (i) crystalline silica, (ii) talc, and (iii) a stoichiometric mixture of citric acid and sodium bicarbonate where that mixture is present at a 1 percent to 100 percent total concentration in a carrier.

10. The process as claimed in claim 1 wherein the blowing agent is a physical blowing agent, and the physical blowing agent is added at a rate of 0.025 to 0.5 kg-moles per 100 kg of polymer feed and is selected from the group consisting of (i) carbon dioxide, (ii) isobutane, (iii) a blend of argon with greater than 50 weight percent of carbon dioxide, (iv) a blend of nitrogen with greater than 60 weight percent of carbon dioxide, (v) a blend of carbon dioxide and isobutane, (vi) a partially fluorinated hydrocarbon which is selected from the group consisting of 1,1,1,2,2-pentafluoroethane (HFC-125), 1,1,1,2-tetrafluoroethane (HFC-134a), 1-chloro-1,2-difluoroethane (HCFC-142b), 1,1,1-trifluoroethane (HFC-143a) and 1,1-difluoroethane (HFC-152a).

11. The process as claimed in claim 1 wherein the foam composition comprises at least one compatibilizing agent which is selected from the group consisting of polyglycol, polyglycol ether, polyethylene oxide, polyglycerol, and blends thereof.

12. The process as claimed in claim 11, wherein said compatibilizing agent is polyglycerol.

13. The process as claimed in claim 7 wherein the foam composition comprises at least one compatibilizing agent which is selected from the group consisting of polyglycol, polyglycol ether, polyethylene oxide, polyglycerol, and blends thereof.

14. The process as claimed in claim 1 wherein the process of forming the propylene polymer foam at the die is semi-continuous or intermittent.

15. The process as claimed in claim 1 wherein the process of forming the propylene polymer foam at the die is continuous.

16. The process as claimed in claim 1 wherein the low density closed-cell propylene polymer foam has a Foamability Index which is greater than 3.0 and a Ebullition Time which is less than $1.5 \times 10^{-4}$ second.

17. The process as claimed in claim 1 wherein at least one member from the group consisting of stabilizer, pigment and processing enhancer, is added to the resin feed.

18. The process as claimed in claim 1 wherein the propylene polymer resin is a propylene polymer mixture containing at least 50 weight percent of branched propylene polymer, and the blowing agent is 0.025 to 0.5 kg-mols per 100 kg of total propylene polymer, of an inorganic, halogen-free blowing agent.

19. The process as claimed in claim 1 wherein the propylene polymer resin is a propylene polymer mixture containing at least 50 weight percent of branched propylene polymer, and the blowing agent is 0.025 to 0.5 kg-mols per 100 kg of total propylene polymer, of an aliphatic organic or partially fluorinated hydrocarbon blowing agent.

20. The process as claimed in claim 1 wherein the propylene polymer resin is a propylene polymer mixture containing at least 50 weight percent of branched propylene polymer, and the blowing agent is a total or up to 0.5 kg-mols per 100 kg of total propylene polymer, of an inorganic, halogen-free blowing agent blended with an aliphatic organic or partially fluorinated blowing agent.

21. The process as claimed in claim 1 wherein the propylene polymer resin is a propylene polymer mixture containing at least 50 weight percent of branched propylene polymer, the blowing agent is 0.025 to 0.5 kg-mols per 100 kg of total propylene polymer, of an inorganic, halogen-free blowing agent, and a compatibilizing agent which is 0.1 to 2.5 weight percent of a polyglycol or a polyglycol ether or a polyethylene oxide or a polyglycerol is incorporated into the foamable composition.

22. The process as claimed in claim 1 wherein the propylene polymer resin is a propylene polymer mixture containing at least 50 weight percent of branched propylene polymer, the blowing agent is a total of up to 0.5 kg-mols per 100 kg of total propylene polymer of an inorganic, halogen-free blowing agent blended with an aliphatic organic or partially fluorinated blowing agent, and a compatibilizing agent which is 0.1 to 2.5 weight percent of a polyglycol or a polyglycol ether or a polyethylene oxide or a polyglycerol is incorporated into the foamable composition.

23. The process as claimed in claim 1 wherein the propylene polymer resin is a propylene polymer mixture containing at least 50 weight percent of branched propylene polymer, the blowing agent is 0.025 to 0.5 kg-mols per 100 kg of total propylene polymer, of an inorganic, halogen-free blowing agent, and greater than 1 percent and less than 30 weight percent of a polymeric modifier, based on the propylene polymer resin weight content, is added to the resin feed.

24. The process as claimed in claim 1 wherein the propylene polymer resin is a propylene polymer mixture containing at least 50 weight percent of branched propylene polymer, the blowing agent is 0.025 to 0.5 kg-mols per 100 kg of total propylene polymer, of an aliphatic organic or partially fluorinated hydrocarbon blowing agent, and greater than 1 percent and less than 30 weight percent of a polymeric modifier, based on the propylene polymer resin weight content, is added to the resin feed.

25. The process as claimed in claim 1 wherein the propylene polymer resin is a propylene polymer mixture containing at least 50 weight percent of branched propylene polymer, the blowing agent is a total of up to 0.5 kg-mols per 100 kg of total propylene polymer, of a blend of an inorganic, halogen-free blowing agent blended wand an aliphatic organic or partially fluorinated blowing agent, and greater than 1 weight percent and less than 30 weight percent of a polymeric modifier, based on the propylene polymer resin weight content, is added to the resin feed.

26. The process as claimed in claim 1 wherein the propylene polymer resin is a propylene polymer mixture containing at least 50 weight percent of branched propylene polymer, the blowing agent is 0.025 to 0.5 kg-mols per 100 kg of total propylene polymer, of an inorganic, halogen-free blowing agent, greater than 1 weight percent and less than 30 weight percent of a polymeric modifier, based on the propylene polymer resin weight content, is added to the resin feed, and a compatibilizing agent which is 0.1 to 2.5 weight percent of a polyglycol or a polyglycol ether or a polyethylene oxide or a polyglycerol is incorporated into the foamable composition.

27. The process as claimed in claim 1 wherein the propylene polymer resin is a propylene polymer mixture containing at least 50 weight percent of branched propylene polymer, the blowing agent is a total of up to 0.5 kg-mols per 100 kg of total propylene polymer, of an inorganic, halogen-free blowing agent blended with an aliphatic organic or partially fluorinated blowing agent, greater than 1 weight percent and less than 30 weight percent of a polymeric modifier, based on the propylene polymer resin weight content, is added to the resin feed, and a compatibilizing agent which is with 0.1 to 2.5 weight percent of a polyglycol or a polyglycol ether or a polyethylene oxide or a polyglycerol is incorporated into the foamable composition.

28. The low density closed-cell propylene polymer foam prepared by the process of claim 1.

29. A short time frame extrusion foaming process for producing a closed-cell propylene polymer foam, comprising the procedure of:
  (a) feeding a propylene polymer resin into an extruder;
  (b) optionally adding a polymeric modifier to the resin feed;
  (c) adding a nucleating agent to the resin feed;
  (d) optionally adding at least one member selected from the group consisting of stabilizers, pigments and processing enhancers;
  (e) plasticating the mixture in an extruder to form a polymeric melt;
  (f) incorporating at least one member selected from the group consisting of at least one organic blowing agent, at least one inorganic blowing agent and blends thereof, into the polymeric melt to form a foamable composition;
  (g) optionally incorporating compatibilizing agent selected from the group consisting of polyglycol, polyglycol ether, polyethylene oxide, or a polyglycerol, into the foamable composition;
  (h) uniformly mixing and cooling the foamable composition to a temperature effective for the expansion of the low-density propylene polymer foam; and
  (i) ejecting the foamable composition mixture through a die at a sufficiently high rate to form a low density closed-cell propylene polymer foam characterized by a Foamability Index greater than 1.9 and an Ebullition Time less than $2.0 \times 10^{-4}$ seconds.

30. A short time frame extrusion foaming process for producing a closed-cell propylene polymer foam, comprising the procedure of:

(a) feeding a propylene polymer resin into an extruder;
(b) adding a polymeric modifier to the resin feed;
(c) adding a nucleating agent to the resin feed;
(d) adding at least one member selected from the group consisting of stabilizers, pigments and processing enhancers;
(e) plasticating the mixture in an extruder to form a polymeric mold;
(f) incorporating at least one member selected from the group consisting of at least one organic blowing agent, at least one inorganic blowing agent and blends thereof, into the polymeric melt to form a foamable composition;
(g) incorporating compatibilizing agent selected from the group consisting of polyglycol, polyglycol ether, a polyethylene oxide, or a polyglycerol, into the foamable composition;
(h) uniformly mixing and cooling the foamable composition to a temperature effective for the expansion of the low-density propylene polymer foam; and
(i) ejecting the foamable composition mixture through a die at a sufficiently high rate to form a low density closed-cell propylene polymer foam characterized by a Foamability Index greater than 1.9 and an Ebullition Time less than $2.0 \times 10^{-4}$ seconds.

* * * * *